June 5, 1945.   G. A. BOLE ET AL   2,377,667
MACHINE FOR MOLDING PYROMETRIC CONES
Filed Aug. 18, 1943
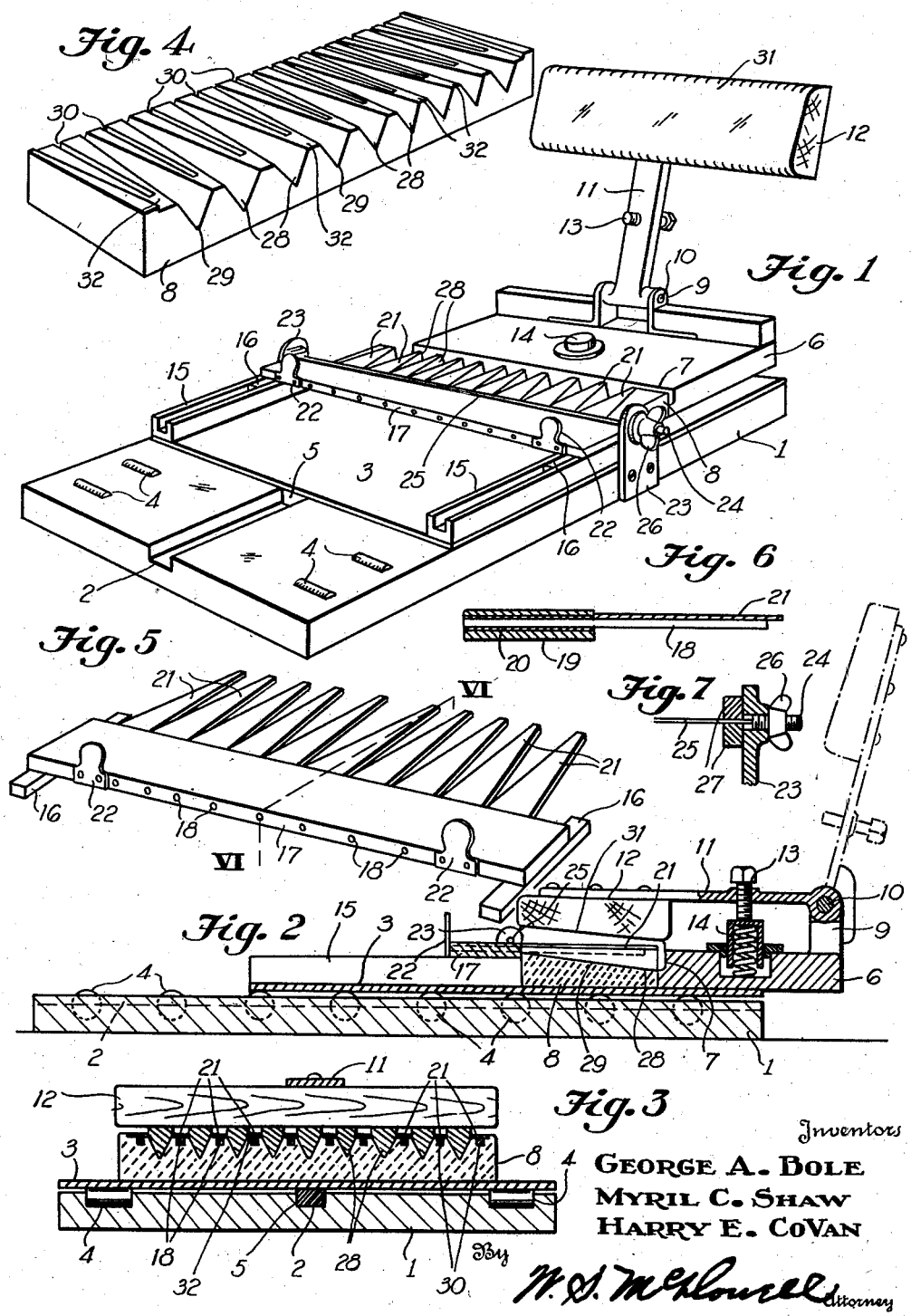
Inventors
GEORGE A. BOLE
MYRIL C. SHAW
HARRY E. CoVAN Patented June 5, 1945

2,377,667

UNITED STATES PATENT OFFICE 2,377,667

MACHINE FOR MOLDING PYROMETRIC CONES

George A. Bole, Myril C. Shaw, and Harry E. Co Van, Columbus, Ohio, assignors to The Edward Orton Jr. Ceramic Foundation, Columbus, Ohio, a testamentary trust Application August 18, 1943, Serial No. 499,149

11 Claims. (Cl. 25—41)

This invention relates to an improved molding apparatus adapted for use in the molding of bodies of plastic composition. In its more specific aspects, our invention is concerned with the filling of molds with clay, or mixtures of ceramic materials, in a plastic state in the formation of pyrometric cones, the latter being of the type employed in kiln atmospheres for determining the maturing temperatures of ceramic wares.

It is important that such cones shall possess a uniform, homogeneous composition and standardized dimensions so that they will deform within relatively narrow temperature limits in providing reliable indications of kiln temperatures.

It is, therefore, an object of the present invention to provide improved means for insuring the filling of the cavities of molds, in which latter said cones are given their desired shape and dimensional characteristics, with uniform quantities of the ceramic bodies in a plastic state, so that when the partially dried cones are subsequently removed from such molds, the same will possess exacting uniformity in weight, shape and physical measurements.

Hitherto, it has been the general practice in the manufacture of such cones to employ metallic molds having cavities formed therein which are shaped and proportioned to produce two sides of a tri-sided pyramidal cone. Operators, by hand-executed operations, have placed quantities of the ceramic mix in a plastic state in these cavities and, after pressing the mix into the same, have removed surplus material by the use of a hand-wielded spatula, or the like, advanced over the open sides and ends of the mold. These operations were necessarily slow and the production of uniform cones depended in a large measure upon the skill and experience of the operators. The formed plastic cones were then removed from the molds and placed on metal pallets where the cones were dried, such procedure frequently resulting in the production of warped cones.

Another object of the present invention is to provide an improved machine for filling the cavities of cone-forming molds with the plastic mix and to remove the excess material from the mold in a more expeditious, uniform and satisfactory manner than has been obtained with the use of prior methods and apparatus, and, moreover, to enable the operations to be performed in an efficient manner by relatively inexperienced operators, if necessary.

For a further understanding of the invention, reference is to be had to the following description and the accompanying drawing, wherein:

Fig. 1 is a perspective view of a cone-molding press mechanism formed in accordance with the present invention;

Fig. 2 is a vertical longitudinal sectional view taken through the press;

Fig. 3 is a vertical transverse sectional view;

Fig. 4 is a perspective view of one of the cone-forming molds used in connection with the press;

Fig. 5 is a perspective view of the movable finger bar of the apparatus;

Fig. 6 is a vertical sectional view on the line VI—VI of Fig. 5;

Fig. 7 is a detail sectional view disclosing the wire clamping and tensioning means.

Referring to the drawing, the numeral 1 designates the bed of our improved machine, the same being of slab-like form, having a groove 2 formed centrally in its upper horizontal surface. Mounted for sliding movement over the upper surface of the bed is a slidable bed plate 3, preferably of brass, stainless steel or other corrosion-resisting material. Antifriction devices 4 are preferably disposed between the bed 1 and the under side of the bed plate 3 in order that sliding movement of the latter with respect to the bed may be facilitated. Also, the plate 3 is guided in its movement by having the under surface thereof formed with a depending rib 5 arranged within the guiding groove 2.

At its rear end, the bed plate has mounted thereon a block 6, having its forward vertical wall 7 arranged to constitute a rest or stop, and against which may be placed one of the longitudinal edges of a cone mold 8, preferably of plaster or like moisture absorbing composition. The upper surface of the block 6, contiguous to the rear edge thereof, is provided with fixed brackets 9, having upstanding apertured ears between which is fulcrumed, as at 10, the lower or inner end of a vertically swinging arm 11. At the upper end of this arm, there is provided a pressing head 12, preferably in the form of a wood block, and being composed of a soft wood such as pine or other absorbent material. Passing through the arm 11 intermediately of its length is an adjustable screw 13, the latter being so arranged that when the arm 11 and head 12 is swung to a downward position, capable of pressing on the mold 8, the inner end of the screw 13 will engage with a spring pressed thimble 14, projecting upwardly from the upper horizontal surface of the block 6, and used for a purpose to be presently explained.

The upper surface of the sliding bed plate 3 is provided at the opposite ends thereof with a pair of grooved guides 15 which are adapted to receive runners 16 provided on a transversely extending and relatively movable mold guard or bar 17. The guard 17 carries at longitudinally spaced intervals a plurality of fixed rearwardly extending metallic rods 18, the inner ends of which are securely held in connection with the bar-like body of the guard 17 by being embedded in plaster sleeves 19 disposed in openings 20 formed horizontally in said guard. Plaster is used since it produces sufficient corrosion of the forward ends of the rods 18 to firmly seal the latter in the bar 17, preventing relative movement therebetween. The spaced rods each carry a wedge-shaped metallic finger 21 which are soldered or otherwise secured in a firm and positive manner to the ends of the rods 18 projecting rearwardly beyond the bar 17. The forward edge of the bar is provided with upstanding finger-engaging projections or tabs 22 by means of which the bar may be reciprocated in the guides 15.

The longitudinal side edges of the bed 1 are provided with upstanding brackets 23, the upper ends of which are apertured to loosely receive horizontally disposed threaded studs 24. To the inner ends of these studs there is fastened the ends of a cutting wire 25 and by tightening wing nuts 26 carried by the outer ends of the studs 24, the cutting wire may be placed under tension. Such tension may be further preserved by the provision of clamping jaws 27 which are carried by the inner surfaces of the brackets 23 and which engage the ends of the cutting wire after it has been tensioned by the nuts 26 to hold the wire against loss of tension.

The molds 8 used in association with the press each comprise a slab composed of a water-absorbing material, such as plaster. The upper surface of each mold is shaped to produce a plurality of spaced cavities 28, which are substantially V-shaped in vertical cross section, the bottom 29 of each cavity being disposed at an acute angle with respect to the horizontal, so that one end of the cavity will be shallow while the other end will be comparatively deep, so that cones molded in these cavities will comprise three-sided pyramids. Between the cavities 28, the molds are formed with grooves 30 in which the finger-supporting rods 18 are receivable as finger guides when the mold is in contact with the gauge wall 7 of the block 6.

In the use of the machine, pre-cut blanks of the plastic body are inserted into each of the mold cavities 28. To insure the complete filling of the cavities, these blanks possess more material than is actually necessary to form a cone so that a part of such surplus material will project above the upper surface of the mold. A mold so filled with the cone-forming blanks is then placed on the bed plate 3 with the longitudinal side of the mold containing the deeper ends of the cavities 28 disposed in contact with the wall 7.

It will be noted that the wall 7 is cut away so that the same will be spaced from the deeper ends of the cavities, permitting surplus material to issue from the deeper ends of the cavities during the pressing operation. With the blank-filled mold so located, the finger bar 17 is advanced in the guides 15 so that the rods 18 will enter the grooves 30 in the top of the mold 8, completely occupying said grooves and thereby positioning the metallic fingers 21 over the triangular upper surfaces 32 of the mold which are formed between the cavities 28. The fingers thus protect the top surfaces of the plastic mold during the following pressing and other operations and provide gauge elements for determining and effecting the formation of the third side of the cone, that is, the side which is not shaped by the walls of the cavity 28. The pressing head 12 is then swung from its upright to its lowered position so that the surface 31 of said head engages with the cone-forming blanks in the mold and the fingers 21, crowding the plastic material comprising such blanks into the mold cavities to compact the same and completely and uniformly fill the cavities. Due to the plasticity of the body, the pressing head 12 remains in contact with the clay blanks even though the head is urged upwardly by the action of the spring-pressed thimble 14.

When the pressing operation has been completed, the bed plate together with the devices arranged thereon, are moved forwardly, so that the cutting wire 25 will contact the upper surfaces of the metallic fingers 21 and shear off excess clay above the cavities, forming the third side of each cone. Due to the shearing action, the head 12 responds to the spring pressed thimble 14 and automatically moves upwardly, the surplus material clinging to the surface 31 of the pressing head and being freed from engagement with the mold. The head may then be elevated manually to its fully raised position and surplus material removed therefrom. Any small amount of surplus material which may remain above the upper surfaces of the fingers 21 may then be removed with a spatula or other scraping blade. Thereafter, the mold may be moved longitudinally past a pair of cutting wires, not shown, which sever surplus material projecting from the ends of the cavities, completely truing the molded plastic material for cone formation.

Upon the removal of the mold from engagement with the machine and the finger bars 17, the same is placed upside down on plaster slabs, not shown, and permitted to air dry for a period of two to three hours. During this time, a considerable portion of the moisture in the plastic cones is absorbed by the plaster composition of the mold and the slabs on which they are placed, so that at the end of such period, the molded cones will possess sufficient rigidity and structural stability as to permit the same to be removed from the mold cavities 28 without any adherence with the walls of the latter. The removed cones are then placed in spaced order on pallets and subjected to mild artificial heating several hours to render the same suitable for commercial employment.

In view of the foregoing, it will be seen that the present invention provides apparatus adapted for the methodical and accurate formation of pyrometric cones. The mechanism serves to effect the rapid and efficient production of uniform and standardized cones which will respond in a definite and predetermined manner to certain firing temperatures used in the kiln burning of ceramic products. The weight and dimensional accuracy of each cone so formed conforms to exacting requirements and further, with the use of the apparatus, these results are obtainable without necessarily employing highly experienced operators.

We claim:

1. Molding apparatus comprising a base, a bed plate slidable longitudinally of said base, a mold rest carried by said plate, said plate being formed to receive a mold of block-like form adapted to be removably positioned on said plate with one of its sides in engagement with said rest, said mold having a plurality of open-topped cavities formed therein, said cavities providing therebetween on the top of said mold a plurality of triangular surfaces, there being an open-ended groove formed in each of said surfaces, a finger bar mounted for sliding movement on said plate, a plurality of triangular fingers projecting horizontally and rearwardly from one edge of said bar arranged to engage and protect the top surfaces of the mold formed between said cavities, supporting rods projecting from said bar and disposed immediately beneath said fingers to reenforce and support the latter, said rods being receivable within the grooves of said mold when said fingers are in engagement with the top surfaces of the mold, a movable pressing head carried by said plate and operable upon manipulation to force plastic materials into the cavities of said mold, and a cutting device for said materials supported from said base and extending transversely across said plate at an elevation so disposed that when the plate is moved forwardly, said device will have wiping engagement with said fingers to remove plastic material projecting above the open tops of said cavities.

2. Molding apparatus for plastic materials comprising a base, a bed mounted for longitudinal sliding movement on said base, said bed being provided with a mold stop and formed to receive a mold of block-like form which is adapted to be removably positioned on said bed with one of its sides in engagement with said stop, said mold having a plurality of open-topped cavities formed therein, a mold guard slidably mounted on said bed and arranged to cover and protect the top surfaces of said mold located between said cavities, a movable pressing head carried by said bed and operable upon manipulation to force plastic materials into the cavities of said mold, and a cutting device supported from said base to extend transversely across said bed at an elevation so disposed that when the bed is moved forwardly said device will have cutting engagement with said guard to sever plastic materials projecting above the open tops of said cavities.

3. Apparatus for molding plastic materials comprising a base, a bed mounted for longitudinal sliding movement on said base, a mold rest carried by said bed and against which one side of a mold of block-like form is adapted to be placed when the mold is positioned on said bed, a guard slidably mounted on said bed, said guard having rearwardly and horizontally extending fingers which are adapted to engage and protect the top surfaces of the mold, said surfaces being provided between open-topped material-receiving cavities provided in said mold, a movable pressing head carried by said bed operable to force plastic materials into the cavities of said mold, and a tensioned cutter wire supported from said base and extending transversely across said bed at such elevation that when the bed is moved forwardly, said wire will have cutting engagement with the fingers of said guard to effect severance of plastic material projecting above the open tops of the mold cavities.

4. Molding apparatus as defined in claim 3, in combination with adjustable means for maintaining the cutter wire under tension.

5. Molding apparatus comprising a base, a bed fitted for sliding movement longitudinally of said base, a mold rest carried by one end of said bed, said rest being adapted for engagement with one side of a block-like mold having material-receiving cavities formed in the top thereof, spaced longitudinally extending guides carried by said bed, a mold guard mounted for guided sliding movement in said guides, said guard being formed with rearwardly and horizontally projecting fingers arranged to engage and protect the upper surfaces of the mold found between said cavities, and a movable pressing head carried by said bed and operable upon manipulation to force plastic materials into the cavities of said mold.

6. Apparatus for molding plastic materials comprising a base, a bed slidable longitudinally of said base, a mold rest carried by said bed, said rest being adapted to engage one side of a block-like mold when the latter is positioned on said bed, guide means carried longitudinally by said bed, a mold guard mounted for sliding movement in said guide means, said guard being formed with a plurality of rearwardly and horizontally projecting fingers arranged to engage the upper surface of a mold retained in engagement with said rest, said fingers being arranged to rest between open-topped material-receiving cavities provided in the upper portion of said mold, a movable pressing head carried by said bed and operable upon manipulation to force plastic materials into the cavities of said mold, and a cutter wire supported from said base and extending transversely across said bed at such elevation that when the plate is moved forwardly, said wire will pass between said head and said fingers to effect severance of plastic material projecting above the open tops of the mold cavities.

7. Apparatus for molding plastic materials comprising a base, a bed slidable longitudinally of said base, a mold rest carried by said bed, said rest being adapted to engage one side of a block-like mold when the latter is positioned on said bed, guide means carried longitudinally by said bed, a mold guard mounted for sliding movement in said guide means, said guard being formed with a plurality of rearwardly and horizontally projecting fingers arranged to engage the upper surface of a mold retained in engagement with said rest, said fingers being arranged to project between open-topped material-receiving cavities provided in the upper portion of said mold, a movable pressing head carried by said bed and operable upon manipulation to force plastic materials into the cavities of said mold, a cutter wire supported from said base and extending transversely across said bed at such elevation that when the plate is moved forwardly, said wire will pass between said head and said fingers to effect severance of plastic material projecting above the open tops of the mold cavities, and spring means normally tending to elevate said head when the latter is in engagement with plastic materials contained in said mold.

8. A mold press comprising a base, a bed plate slidable longitudinally of said base in a definite lineal course, a finger bar mounted for sliding movement on said plate, a plurality of triangular fingers projecting horizontally and rearwardly from one edge of said bar and arranged to project over a mold positioned on said plate in engagement with said rest, supporting rods projecting from said bar and disposed immediately beneath said fingers to reenforce and support the latter, a movable pressing head carried by said plate and operable upon manipulation to force plastic materials into the cavities of a mold disposed on said plate, and a cutting device for said material supported from said base and extending transversely across said plate at an elevation so disposed that when the plate is moved forwardly, said device will have wiping engagement with said fingers to remove excess plastic material projecting above the upper surfaces of the mold.

9. A mold press comprising a base, a bed plate mounted for longitudinal sliding movement on said base in a confined course, a mold stop on said plate against which a mold for the molding of plastic materials is adapted to be positioned, a mold guard slidably mounted on said plate and arranged to cover and protect the top surfaces of a mold, a movable pressing head carried by said bed and operable upon manipulation to force plastic materials into the cavities of the mold, and a cutting device supported from said base extending transversely across said plate at an elevation so disposed that when the plate is moved forwardly, said device will have wiping engagement with said guard to sever plastic materials projecting above the upper surfaces of said mold.

10. Apparatus for molding plastic materials comprising a base, a bed slidable longitudinally of said base, a mold rest carried by said bed, said rest being adapted to engage one side of a block-like mold when the latter is positioned on said bed, guide means carried longitudinally by said bed, a mold guard mounted for sliding movement in said guide means, said guard being formed with a plurality of rearwardly and horizontally projecting fingers arranged to engage the upper surface of a mold retained in engagement with said rest, a pivotally movable pressing head carried by said bed and operable upon manipulation to force plastic materials into receiving cavities on the mold, and a cutter wire supported from said base and extending transversely across said bed at such elevation that when the plate is moved forwardly, said wire will pass between said head and fingers to effect severance of plastic material projecting above the upper surfaces of the mold.

11. Apparatus for molding plastic materials comprising a base, a bed slidable longitudinally of said base, a mold rest carried by said bed, said rest being adapted to engage one side of a block-like mold when the latter is positioned on said bed, guide means carried longitudinally by said bed, a mold guard mounted for sliding movement in said guide means, said guard being formed with a plurality of rearwardly and horizontally projecting fingers arranged to engage the upper surface of a mold retained in engagement with said rest, a pivotally movable pressing head carried by said bed and operable upon manipulation to force plastic materials into receiving cavities of the mold, a cutter wire supported from said base and extending transversely across said bed at such elevation that when the plate is moved forwardly, said wire will pass between said head and fingers to effect severance of plastic material projecting above the upper surfaces of the mold, and spring means carried by said bed and tending to elevate said head when the latter is in engagement with said mold.

GEORGE A. BOLE.
MYRIL C. SHAW.
HARRY E. CO VAN.